(12) United States Patent
Duffy (10) Patent No.: US 9,012,013 B2
(45) Date of Patent: Apr. 21, 2015

(54) EXPANDABLE FACE MASK WITH REINFORCING NETTING

(75) Inventor: Dean R. Duffy, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1755 days.

(21) Appl. No.: 12/338,091

(22) Filed: Dec. 18, 2008

(65) Prior Publication Data

US 2010/0154806 A1    Jun. 24, 2010

(51) Int. Cl.
| | |
|---|---|
| *B32B 3/28* | (2006.01) |
| *A62B 18/02* | (2006.01) |
| *B32B 3/30* | (2006.01) |
| *A41D 13/11* | (2006.01) |
| *A62B 23/02* | (2006.01) |
| *B32B 1/00* | (2006.01) |
| *B32B 5/02* | (2006.01) |
| *B32B 27/12* | (2006.01) |

(52) U.S. Cl.
CPC ......... *A62B 18/025* (2013.01); *Y10T 156/1051* (2015.01); *B32B 1/00* (2013.01); *B32B 3/30* (2013.01); *B32B 5/022* (2013.01); *B32B 5/028* (2013.01); *B32B 27/12* (2013.01); *B32B 2250/20* (2013.01); *Y10T 428/2457* (2015.01); *Y10T 428/2495* (2015.01); *A41D 13/1115* (2013.01); *A62B 23/025* (2013.01)

(58) Field of Classification Search
CPC .......... B32B 1/00; B32B 5/022; B32B 5/028; B32B 27/12; B32B 2250/20; Y10T 428/2457; Y10T 428/2495; Y10T 156/1051; A62B 18/025; A62B 23/025; A41D 13/1115

USPC ................................ 442/1–58; 428/167, 213
See application file for complete search history.

(56) References Cited

U.S. PATENT DOCUMENTS

| | | | |
|---|---|---|---|
| 3,170,461 | A | 2/1965 | Watts, Jr. |
| 4,302,495 | A | 11/1981 | Marra |
| 4,478,620 | A | 10/1984 | Tamura |
| 4,661,389 | A | 4/1987 | Mudge |
| 4,688,566 | A | 8/1987 | Boyce |
| 4,850,347 | A | 7/1989 | Skov |
| 5,230,800 | A | 7/1993 | Nelson |
| 5,706,804 | A | 1/1998 | Baumann |
| 5,792,242 | A | 8/1998 | Haskett |

(Continued)

FOREIGN PATENT DOCUMENTS

| | | |
|---|---|---|
| EP | 0137094 | 4/1985 |
| GB | 842766 | 12/1957 |

(Continued)

OTHER PUBLICATIONS

International Search Report PCT/US2009/066306 3 pp., Jun. 28, 2010.

(Continued)

*Primary Examiner* — Elizabeth Cole
(74) *Attorney, Agent, or Firm* — Kenneth B. Wood (57) ABSTRACT

Herein are disclosed face masks that are provided in a generally flat configuration and are capable of being expanded to a cup-shaped configuration. Such masks comprise at least one porous layer that comprises at least one pleat and that is capable of being expanded by at least partially unfolding the at least one pleat. The mask further comprises reinforcing netting laminated to the outer surface of the porous layer.

18 Claims, 3 Drawing Sheets

(56) References Cited

U.S. PATENT DOCUMENTS

| | | |
|---|---|---|
| 6,056,809 A | 5/2000 | Chapman |
| 6,123,077 A | 9/2000 | Bostock |
| 6,394,090 B1 | 5/2002 | Chen |
| 6,923,182 B2 | 8/2005 | Angadjivand |
| 2005/0079379 A1 | 4/2005 | Wadsworth |
| 2006/0102183 A1 | 5/2006 | Skov |
| 2006/0266364 A1 | 11/2006 | Turdjian |
| 2008/0011303 A1 | 1/2008 | Angadjivand |

FOREIGN PATENT DOCUMENTS

| | | |
|---|---|---|
| JP | 10-258065 | 9/1998 |
| JP | 2003-275332 | 9/2003 |
| KR | 20-0370341 | 12/2004 |
| WO | WO 96/28216 A1 | 9/1996 |
| WO | WO 2008/003580 | 3/2008 |
| WO | WO 2008/085546 A2 | 7/2008 |
| WO | WO 2008/085546 A3 | 7/2008 |

OTHER PUBLICATIONS

Extended European Search Report, Publication No. EP2370183, mailed Jan. 15, 2015, 3 pages.

EXPANDABLE FACE MASK WITH REINFORCING NETTING

BACKGROUND

Face masks have found use in a variety of applications in which they are worn over the nose and the mouth of a user, for example to protect the user's respiratory system from particles suspended in the air and/or from unpleasant or noxious gases, to minimize the amount of material expelled from the user's respiratory system into the surrounding atmosphere, or both. Generally, such face masks have been provided in two basic designs—a molded cup-shaped form or a flat-folded, expandable form.

SUMMARY

Herein is disclosed, in various aspects and embodiments, a face mask ("mask") that is provided in a generally flat-folded configuration and is expandable to form a cup-shaped air chamber suitable to fit over the nose and mouth of a wearer. The mask comprises at least one porous layer that comprises at least one pleat and that is capable of being expanded from a smaller area to a larger area by at least partially unfolding the at least one pleat. The porous layer comprises a first major surface that is oriented away from the wearer when the mask is expanded to form a cup-shaped configuration, and a second major surface that is oriented toward the wearer when the mask is so expanded. The mask further comprises reinforcing netting that is laminated to at least a majority of the first major surface of the porous layer.

The reinforcing netting can enable the use of relatively lightweight and delicate, highly porous materials in the porous layer; e.g., allowing such materials to be successfully handled in the process of assembling the mask, while reaping the benefit of the properties of such lightweight and delicate materials (e.g., lower pressure drop exhibited by the porous layer). The netting can also provide enhanced durability, robustness, and abrasion resistance to the porous layer of the mask, in spite of the use of such lightweight and delicate materials in the porous layer.

As disclosed herein, the netting can be pleated along with the porous layer (so that the mask can be provided to a user in a pleated, flat-folded configuration) and can unfold along with the porous layer (so that the mask can be unfolded into an expanded configuration). The netting may help to maintain the mask in an expanded configuration, and yet can be refolded along with the porous layer so that the mask can be refolded into a flat-folded configuration. In particular, the netting allows this unfolding and refolding of the mask to be performed multiple times if so desired by the user.

Thus in one aspect, herein is disclosed a flat-folded, pleated face mask that is expandable into a cup shape for fitting over the mouth and nose of a person, comprising: a porous layer that comprises at least a first major surface that faces generally outward when the mask is expanded into a cup shape and that comprises reinforcing netting that is laminated to at least a portion of the first major surface of the porous layer, wherein the portion of the porous layer with reinforcing netting laminated to the first major surface thereof comprises at least one pleat and is thereby expandable from a flat-folded configuration to an expanded, cup-shaped configuration by at least partially unfolding the at least one pleat and is refoldable from the expanded, cup-shaped configuration to the flat-folded configuration by refolding the at least one pleat.

Thus in another aspect, herein is disclosed a method of making a flat-folded, pleated face mask that is expandable into a cup shape for fitting over the mouth and nose of a person, comprising: providing a laminate comprising a nonwoven web that comprises first and second oppositely facing major surfaces with reinforcing netting laminated to the first major surface; providing at least one porous layer with first and second oppositely-facing major surfaces; attaching the laminate to the at least one porous layer, with the second major surface of the nonwoven web facing a major surface of the at least one porous layer, to form a multilayer structure; and, forming at least one pleat in the multilayer structure.

These and other aspects of the invention will be apparent from the detailed description below. In no event, however, should the above summaries be construed as limitations on the claimed subject matter, which subject matter is defined solely by the attached claims, as may be amended during prosecution.

Like reference symbols in the various figures indicate like elements. Unless otherwise indicated, all figures and drawings in this document are not to scale and are chosen for the purpose of illustrating different exemplary embodiments of the invention. In particular the dimensions of the various components are depicted in illustrative terms only, and no relationship between the dimensions of the various components should be inferred from the drawings, unless so indicated. Although terms such as "top", "bottom", "upper", "lower", "under", "over", "front", "back", "outward", "inward", "up" and "down", and "first" and "second" may be used in this disclosure, it should be understood that those terms are used in their relative sense only unless otherwise noted.

DETAILED DESCRIPTION

Figure 1:
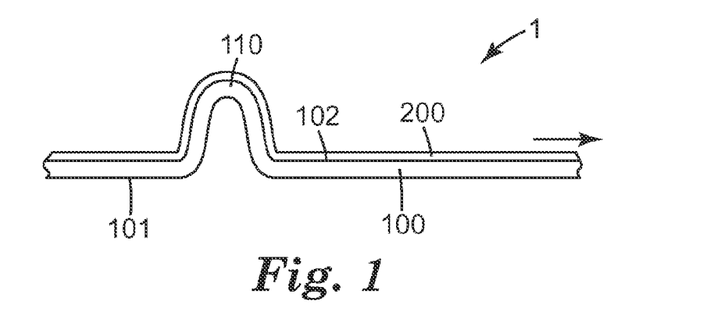
FIG. 1 is a schematic cross sectional view of a portion of an exemplary pleated mask in an unexpanded configuration.

Shown in FIG. 1 is a generic representation of a portion of an expandable face mask 1 (hereafter, "mask"). Mask 1 comprises at least porous layer 100, which comprises first major surface 102, which, upon mask 1 being worn by a user, faces generally outward and may comprise at least a portion of the outer, convex surface of mask 1, and, second major surface 101, which, upon mask 1 being worn by a user, faces generally inward and may comprise at least a portion of the inner, concave surface of mask 1. Porous layer 100 is sheet-like (that is, with a thickness substantially less than its length and breadth), and comprises at least one pleat (fold) 110. Porous layer 100 can be expanded at least in the direction indicated by the arrow in FIG. 1, by at least partially unfolding the at least one pleat 110.

Mask 1 also comprises a layer of reinforcing netting 200, that is laminated (that is, bonded, e.g. under heat and/or pressure) to at least a majority of the area of first major surface 102 of porous layer 100, to provide laminate 300. Netting 200 is pleated in the same manner and pattern as is porous layer 100. In practice, it may be most convenient to laminate netting 200 to porous layer 100 to form laminate 300 and then pleat the combined layers of laminate 300 in one operation.

Figure 2:
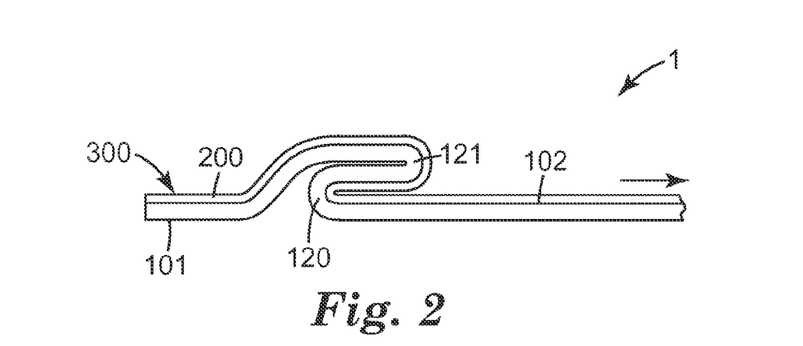
FIG. 2 is a schematic cross sectional view of a portion of an exemplary pleated mask in an unexpanded configuration.

As shown in generic representation in FIG. 2, the at least one pleat 110 in laminate 300 may take the form of at least two generally parallel, oppositely-oriented pleats 120 and 121, with 120 designating an inner pleat and 121 designating an outer pleat. Laminate 300 can be expanded at least in the direction indicated by the arrow in FIG. 2, by at least partially unfolding at least one of pleats 120 and/or 121.

Figure 3:
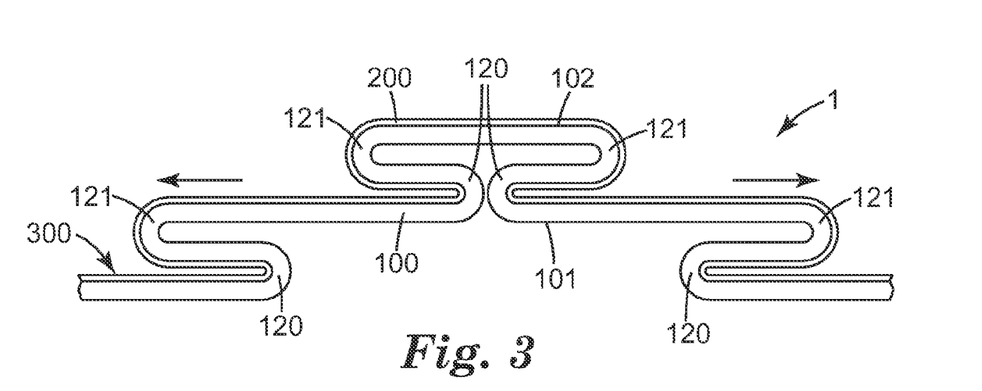
FIG. 3 is a schematic cross sectional view of a portion of an exemplary pleated mask in an unexpanded configuration.

FIG. 3 shows an exemplary flat folded, unexpanded mask, that comprises a multiplicity of pleats 120 and 121 in laminate 300. Such multiple pleats may increase the degree to which porous layer 100 can be expanded by the at least partial unfolding of some or all of the pleats. Laminate 300 can be expanded at least in the directions indicated by the arrows in FIG. 3, by at least partially unfolding at least one of the pleats therein. In the exemplary illustration of FIG. 3, the number, position, spacing, and orientation of the pleats, and so on, are depicted for ease of illustration only, with many configurations being possible.

Figure 4:
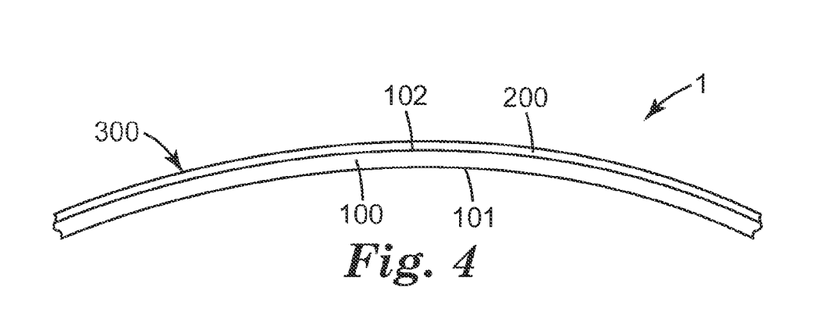
FIG. 4 is a schematic cross sectional view of a portion of an exemplary pleated mask in an expanded configuration.

FIG. 4 depicts in generic representation the result of expanding laminate 300 (for example, the multi-pleated laminate 300 of FIG. 3). Pleats 120 and 121 now having been at least partially unfolded (and not shown on FIG. 4), laminate 300 has been expanded to form a generally cup-shaped configuration with netting 200 located on the outer, convex side of the cup-shaped expanded mask. It should be noted that FIG. 4 is depicted purely for purposes of generically illustrating the concepts disclosed herein, and that in reality, laminate 300 may not necessarily expand to a smooth arc as shown in FIG. 4 (e.g., partially unfolded pleats 120/121 may still be observable).

The disclosures herein are now further illustrated with reference to the exemplary illustration of FIG. 5, which shows a plan view of an exemplary flat-folded mask 1 in an initial, flat-folded, unexpanded state (viewed from the "outer" side that becomes the convex side upon expansion of mask 1). Mask 1 comprises laminate 300 (i.e. porous layer 100, with first and second major surfaces 101 and 102 as previously described, and with netting 200 laminated to first major surface 102 of porous layer 100). In this exemplary design, mask 1 comprises a generally rectangular shape with upper edge 310 (which in use would be positioned on the wearer's nose and upper cheeks), lower edge 320, and side edges 330 and 340. Such edges may be formed and/or reinforced by seaming, e.g. by such techniques as ultrasonic welding, stitching, and the like, to form seamed edges. One or more headbands, not shown in FIG. 5, may be attached to side edges 330 and 340 and/or top edge 310 and bottom edge 320. Optional formable nose piece 311 (e.g., a strip of soft metal, which may be used to assist in conforming upper edge 310 of porous layer 100 to the wearer's nose and/or upper cheeks) may be present. A plurality of generally parallel inner pleats 120 and outer pleats 121 may be present (with inner pleats 120 not shown in FIG. 5), generally oriented along the long axis of the mask. In the exemplary embodiment of FIG. 5, pleats 120 and 121 terminate at seamed side edges 330 and 340, so that the unfolding of at least a portion of each pleat that is near to edge 330 or 340, may be somewhat restricted. Thus, upon expansion of laminate 300, pleats 120 and 121 may unfold to a greater extent in the central portion of laminate 300 than in the areas closest to seamed side edges 330 and/or 340. This arrangement may provide that upon expanding mask 1 from a flat-folded configuration by at least partially unfolding at least some of the pleats in porous layer 100, porous layer 100 expands into a three dimensional concave shape (e.g., by virtue of greater expansion occurring in the central portion of porous layer 100 than near edges 330 and 340).

As disclosed herein, "flat-folded" means that porous layer 100 comprises a plurality of pleats arranged such that at least certain portions of porous layer 100 are arranged in at least partially overlapping relation (e.g., as shown in FIG. 3), such that air passing through at least certain portions of mask 1 may pass through more than one separate thicknesses of porous layer 100. In a flat-folded configuration, the majority of porous layer 100 may be substantially parallel to the plane of flat-folded mask 1, with the thickness of mask 1 being substantially less than the length and breadth of mask 1, even through at some or all locations on mask 1 the thickness of mask 1 may be comprised of multiple thicknesses of porous layer 100.

As disclosed herein, "expanding" means to at least partially unfold at least some of the pleats of porous layer 100 so that porous layer 100 presents a larger area for passage of air, such that, over a majority of the area of mask 1, it is only necessary for air to pass through a single thickness of porous layer 100 to pass through mask 1.

Figure 5:
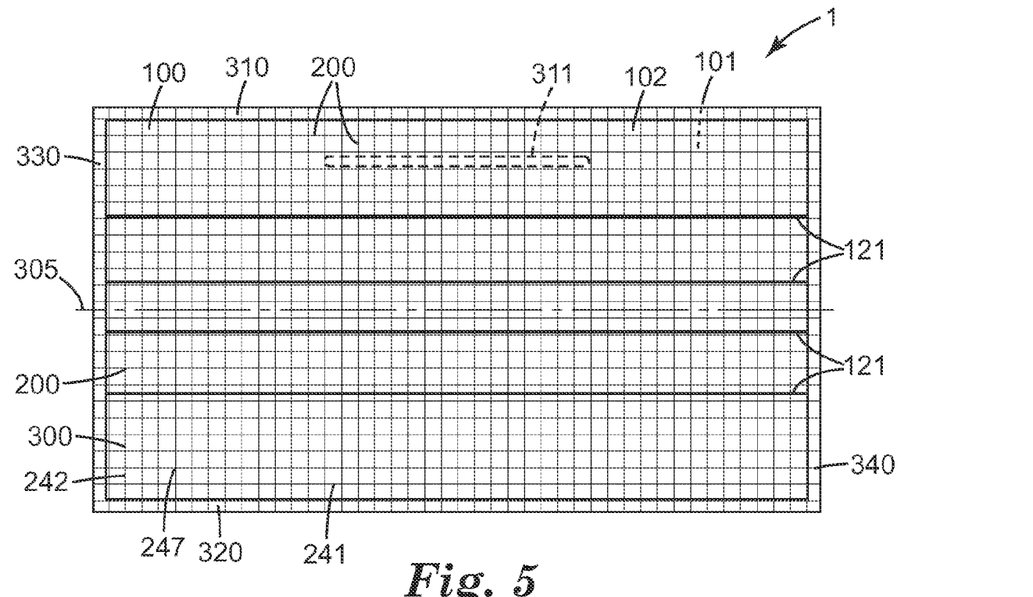
FIG. 5 is a plan view of an exemplary pleated mask in an unexpanded configuration.

In the exemplary embodiment of FIG. 5, netting 200 is provided substantially over the entirety of first major surface 200. However, in alternative embodiments netting 200 can be provided over a majority (i.e., greater than 50%) of the surface area of porous layer 100. In the embodiment of FIG. 5, netting 200 is provided as a single, contiguous piece. However, in alternative embodiments netting 200 can be provided as two or more separate pieces, as desired. In the embodiment of FIG. 5, netting 200 is bonded into seamed edges 310, 320, 330 and 340. However, netting 200 can terminate short of any or all of these seamed edges as desired.

Figure 8:
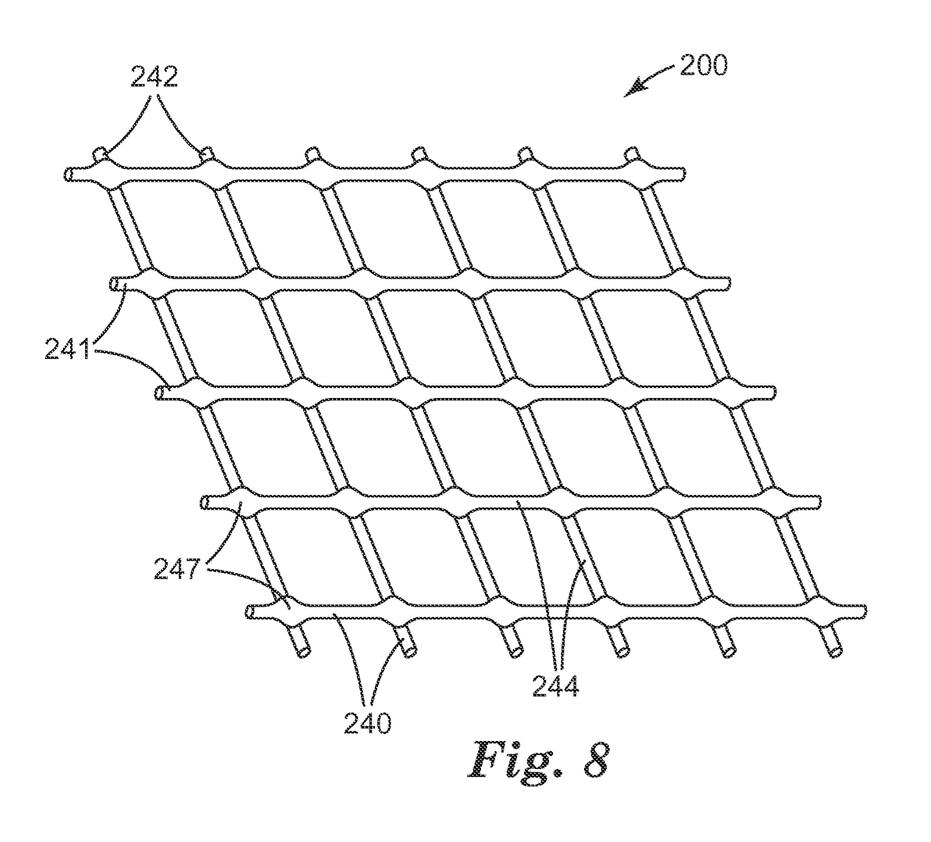
FIG. 8 is a perspective view of an exemplary reinforcing netting.

In the embodiment of FIG. 5, netting 200 comprises strands 240 that connect at intersections 247, strands 240 being comprised of a first set of generally parallel strands 241 and a second set of generally parallel strands 242 that are oriented generally perpendicular to strands 241 (e.g., of the type shown in FIG. 8). However, other configurations of netting 200 are possible, as discussed later herein. In the embodiment of FIG. 5, first set of strands 241 are generally aligned with the long axis of mask 1 and porous layer 100. This design may have advantages in manufacturing, as laminate 300 may be fed to the mask-making process from a roll good, with one set of strands of netting 200 being aligned directly downweb with the roll good, thus supplying the maximum reinforcing of laminate 300 in this direction. However, other configurations are possible.

In the embodiment of FIG. 5, the pleats run generally parallel to the long axis of mask 1 and laminate 300 (i.e., so as to be oriented transversely across the face of a wearer). In this particular embodiment, one set of the strands (set 241 in FIG. 5) is generally aligned with the pleats. This configuration may provide for enhanced ability to pleat, unfold and refold laminate 300, since some, most, or all of the pleats may fall in between strands 240 (that is, in the act of pleating it may only be necessary to bend strands of set 241 rather than strands of sets 241 and 242). Other configurations are possible, however.

In one embodiment, mask 1 may comprise a stiffening element (not shown in any figure) positioned adjacent surface 101 of porous layer 100. Such a stiffening element may comprise at least one engaging feature that permits sliding movement, in a first direction, of a portion of porous layer 100 that is adjacent the engaging feature, while preventing sliding movement of the adjacent portion of porous layer 100 in a second direction opposite the first direction. Such a stiffening element may permit the expanding of mask 1 from a flat-folded configuration into an expanded configuration, while also providing the expanded mask with an enhanced ability to resist deforming or collapsing. The use of such stiffening elements is described in U.S. patent application Ser. No. 12/337,842, filed on the same day as this patent application, entitled EXPANDABLE FACE MASK WITH ENGAGABLE STIFFENING ELEMENT, herein incorporated by reference.

Figure 6:
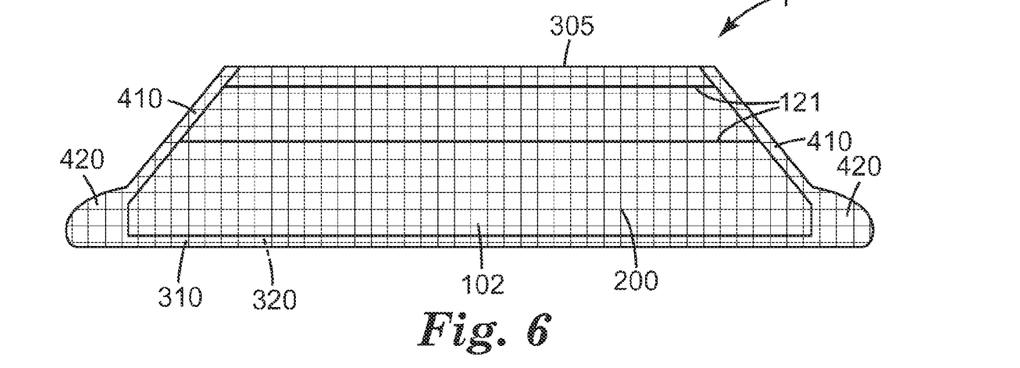
FIG. 6 is a plan view of an exemplary pleated mask in an unexpanded configuration.

FIG. 6 illustrates in plan view another exemplary flat-folded configuration in which mask 1 may be provided. The mask of FIG. 6 may be obtained, in one exemplary method, by providing a mask similar to that of FIG. 5 and folding it along fold line 305 such that upper edge 310 is brought near lower edge 320. (In the configuration shown in FIG. 6, fold line 305 is a bisecting fold line, such that upper edge 310 is positioned in alignment with lower edge 320, but other, e.g., offset, configurations are possible). With the mask so folded, the top and bottom layers can be bonded together (e.g., by ultrasonic bonding, stitching, etc.) to form bonded seams. Excess material outside of the bonded seams can be removed (e.g., by die cutting) to form bonded seamed edges 410 that comprise the side edges of mask 1, as shown in FIG. 6. The cutting can be performed so as to provide tabs 420, to which one or more headbands (not shown in FIG. 6) can be fastened. This providing of bonded seamed side edges 410 may further limit (e.g., in comparison to a mask of the general type of FIG. 5) the unfolding of the portion of pleats 120/121 that are near bonded seamed side edges 410, thus possibly enhancing the degree to which mask 1 can form a cup shape that conforms advantageously to the wearer's face. If desired, flanges (not shown in FIG. 6) can be provided that project generally outward from bonded seamed side edges 410, such that when mask 1 is donned, the flanges project, e.g. both laterally and frontally, from mask 1, which may further assist in providing structural integrity to the mask to keep it in an expanded, cup-shaped configuration. The use of such flanges is described in U.S. patent application Ser. No. 12/338,084, filed on the same day as this patent application, entitled FLAT FOLD RESPIRATOR HAVING FLANGES DISPOSED ON THE MASK BODY, herein incorporated by reference.

When a user desires to expand a flat-folded mask (e.g., of the type shown in FIG. 6) into an expanded configuration, upper and lower edges 310 and 320 can be pulled apart from each other in a central portion of mask 1, which will expose at least a portion of the concave interior of mask 1. Then, the user can apply pressure to the interior surface 101 of porous layer 100 and/or continue pulling edges 310 and 320 apart, so as to at least partially expand laminate 300 from its pleated configuration by at least partially unfolding at least some portion of some pleats 120 and/or 121. The result of this operation is the expansion of mask 1 from a flat-folded configuration into a cup-shaped configuration.

The inventor has discovered that, first, if netting 200 is chosen properly, the presence of netting 200 on at least a portion of first surface 102 of porous layer 100 (i.e., the outer surface of mask 1 when expanded) may not unacceptably interfere with the unfolding of pleats 120 and/or 121 and the expansion of mask 1 into a cup-shaped configuration. Second, reinforcing netting 200 may reinforce porous layer 100 so as to enhance the ability of mask 1 to maintain the cup-shaped configuration (for example, such that mask 1 may be more resistant to collapsing against the mouth of a user during inhalation, may be taken off and put on a number of times with the cup-shaped configuration being maintained, etc.). Third, even while providing this enhanced ability of mask 1 to maintain the cup-shaped configuration, netting 200 may still permit mask 1 to be refolded into a flat-folded configuration. Fourth, netting 200 may permit this expanding and refolding to be carried out through numerous cycles.

Figure 7:
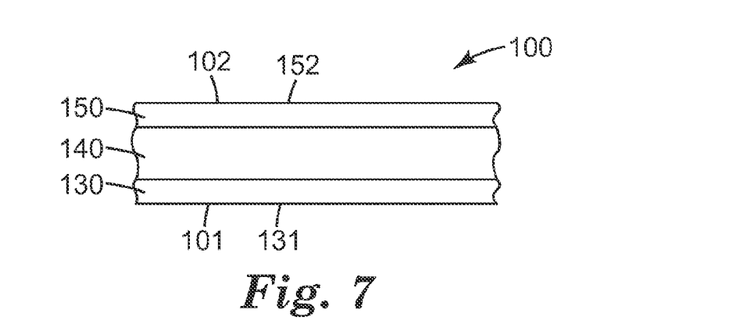
FIG. 7 is a schematic cross sectional view of a portion of an exemplary porous layer.

The disclosures herein are now further illustrated with reference to the exemplary illustration of FIG. 7, which shows a cross-sectional view of an exemplary porous layer 100. Porous layer 100 can be used for performing filtration (i.e., to remove substances, whether solid, liquid, vaporous, gaseous, etc. from an airstream), and as such can comprise at least one filtration layer. In one embodiment, porous layer 100 may be comprised of two or more porous layers (e.g., sublayers) which may be present for various purposes. For example, with reference to FIG. 7, porous layer 100 may comprise at least one filtration layer 140 disposed between an outside cover layer 150 and an inside cover layer 130 (inside denoting a layer that will face inward within the concave interior of the expanded mask; outside referring to a layer that will face outward on the convex exterior of the expanded mask). In such case, during use of mask 1, air will pass sequentially through layers 150, 140 and 130 during inhalation, and sequentially through layers 130, 140 and 150 during exhalation (if desired, an exhalation valve (not shown in any Figure) may be used, which may allow at least a portion of the exhaled air to rapidly pass through the exhalation valve hence bypassing layers 130, 140 and 150). Any or all of filtration layer 140, inside cover layer 130, and outside cover layer 150, can be bonded together, for example at least at one or more edges of porous layer 100. Some or all of these layers can also be bonded (e.g., spot-bonded) in various other locations as desired.

Regardless of its specific construction, porous layer 100 may comprise a relatively low pressure drop (for example, less than about 195 to 295 Pascals at a face velocity of 13.8 centimeters per second, when measured such that the air passes only through a single thickness of porous layer 100). In specific embodiments, porous layer comprises a pressure drop of less than about 100 Pascals, or less than about 50 Pascals.

Filtration layer 140 may comprise any suitable layer or layers of material capable of performing filtration. Examples of suitable filter material may include microfiber webs, fibrillated film webs, woven or nonwoven webs (e.g., airlaid or carded staple fibers), solution-blown fiber webs, or combinations thereof. Fibers useful for forming such webs include, for example, polyolefins such as polypropylene, polyethylene, polybutylene, poly(4-methyl-1-pentene) and blends thereof, halogen substituted polyolefins such as those containing one or more chloroethylene units, or tetrafluoroethylene units, and which may also contain acrylonitrile units, polyesters, polycarbonates, polyurethanes, rosin-wool, glass, cellulose or combinations thereof. In a specific embodiment, filtration layer 140 comprises at least one layer of blown microfibers.

Filtration layer 140 may comprise such features as electrically charged fibers, staple fibers, bicomponent staple fibers, oil-resistant treatments (e.g., fluorinated surfaces), and the like. Filtration layer 140 (and/or porous layer 100 as a whole) may be primarily intended for the filtration of particulates; or, (for example by the inclusion of specific reagents, sorbent materials, etc.) may be also or instead intended for the removal of gaseous and/or vaporous substances and the like.

Outside cover layer 150, if present, may serve to protect filtration layer 140. As such, it may for example be comprised of a relatively lightweight and highly porous nonwoven material such as a spunbonded polyolefin. Other nonwovens that may be useful as outside cover layer 150 may include for example certain spunlaid webs, thermally bonded spunlaid webs, carded webs, flashspun webs, and the like. If porous layer 100 comprises outside cover layer 150, surface 152 of outside cover layer 150 may comprise at least a portion of surface 102 of porous layer 100, with netting 200 being present on surface 152 of outside cover layer 150.

If outside cover layer 150 is present, it may be attached (e.g., laminated, bonded, etc.) to e.g. filtration layer 140, after which netting 200 may be attached to layer 150 of combined layers 140 and 150 so as to form laminate 300. However, it may be preferable to laminate netting 200 to outside cover layer 150 to form laminate 350 (laminate 350 not shown in any Figure herein, the term being used for convenient reference), to then attach laminate 350 to other desired layers (e.g., filtration layer 140 and/or other porous layers) to form a multilayer structure (i.e., laminate 300), and to then pleat the multilayer structure in a single operation. This approach may allow a relatively lightweight and porous outside cover layer 150 to be used, which may provide enhanced performance of mask 1 (e.g., a lower pressure drop, and/or the minimizing any caking of filtered particulate on outside cover layer 150). Such a lightweight and porous outside cover layer might normally be too fragile to be easily used in the high volume and high speed web handling operations involved in typical production of masks; however, the laminating of netting 200 to outside cover layer 150 may provide laminate 350 with sufficiently robust physical properties (e.g., strength and durability) to be compatible with the requisite web handling and assembly operations. This may be particularly true if netting 200 is laminated to outside cover layer 150 such that one set of strands 240 of netting 200 is aligned substantially downweb with outside cover layer 150 such that laminate 300 may be fed to the equipment for assembly of laminate 300 and/or mask 1, from a roll good with one set of strands of netting 200 aligned directly downweb with the roll good, thus supplying the maximum reinforcing of laminate 350 in this direction.

In various embodiments, outside cover layer 150 comprises a nonwoven material with a basis weight of less than about 55 grams per square, less than about 35 grams per square meter or less, of less than about 25 grams per square meter, of less than about 20 grams per square meter, or of about 10 grams per square meter. In a specific embodiment, outside cover layer 150 is comprised at least in part of a spunbonded polypropylene. In another embodiment, outside cover layer 150 is comprised at least in part of blown microfibers.

Inside cover layer 130, if present, may serve to protect filtration layer 140 and/or to provide a comfortable surface in case of contact with the wearer. Inside cover layer 130 can be chosen from any suitable material (e.g., such as a relatively lightweight and highly porous non-woven material such as a spunbonded polyolefin).

Porous layer 100 can comprise other layers as desired. For example (e.g. for use in surgical applications) porous layer 100 can comprise one or more layers that are chosen or treated for enhanced resistance to penetration by liquid water.

The disclosures herein are now further illustrated with reference to the exemplary illustration of FIG. 8, which shows a perspective view of an exemplary reinforcing netting 200. Reinforcing netting 200 comprises a generally sheet-like structure (e.g., with a thickness substantially less than its length and breadth) comprised of strands 240 that connect at intersections 247. In one embodiment, shown in FIG. 8, strands 240 comprise a first set of generally parallel strands 241 and a second set of generally parallel strands 242 that are oriented generally perpendicular to strands 241, with the spacings between individual strands 241 being constant, and with the spacings between individual strands 241 being similar to that between individual strands 242. In this embodiment, strands 241 and 242 combine in a regular, repeating, generally square pattern. However, various other embodiments are possible. For example, the spacing between strands 241 can be different from that between strands 242, such that a rectangular pattern is formed. Or, the spacing between individual strands can be variable. Or, strands 241 may be at an angle to strands 242 other than 90 degrees, which may provide e.g., a diamond-shaped pattern. In another embodiment, netting 200 may not be comprised of relatively long, linear strands that pass through intersections 247 without changing direction. Rather, netting 200 can be comprised of relatively short strands, two or more of which can meet at bonded intersections, so as to comprise, e.g., a hexagonal netting (e.g., of the general geometry mentioned for example in U.S. Pat. No. 6,146,745).

Regardless of the specific structure, the term netting 200 denotes a relatively open structure composed of only a few layers, or only one layer, of strands, and characterized by multiple line-of-sight through-penetrations which penetrate uninterrupted through the entirety of the thickness of netting 200. Such a structure may be contrasted to, e.g., a nonwoven structure which comprises multiple layers of fibers and few or no line-of-sight through-penetrations. In various embodiments, such line-of-sight openings comprise at least about 80%, at least about 90%, or at least about 95%, of the area (e.g., length times breadth) of netting 200. In various embodiments, the line-of-sight openings are at least about 3 mm, 5 mm, 10 mm, or 15 mm, in their largest dimension (measured along the length or breadth of netting 200).

Netting 200 may be a relatively lightweight and/or porous and with a relatively high air permeability. In various embodiments, netting 200 may comprise a basis weight of less than about 45 grams per square meter, less than about 35 grams per square meter or less than about 25 grams per square meter.

In one embodiment, strands 241 and strands 242 meet at intersections 247, and are bonded to each other and/or integrally connected to each other at intersections 247 (e.g., as opposed to simply being in contact, entangled, woven, etc.). Such a structure may be made in several ways, for example extruding thermoplastic material so as to form an interconnecting network (e.g., extruding thermoplastic material followed by slitting, cutting, perforating, embossing, and/or stretching so as to form the netting, as mentioned for example in U.S. Pat. No. 4,190,692). Or, sets of strands may be brought together (e.g., woven together, or simply laid atop each other) and then bonded together (e.g., melt-bonded by heat and pressure) at their point of contact to form bonded intersections 247. In an alternative embodiment, strands 241 and strands 242 may comprise a woven structure in which strands 241 and 242 are not bonded together. However, with such relatively large (e.g., greater than 1 mm or more) line-of-sight opening dimensions as may be desired in certain embodiments herein, such woven structures may have disadvantages in terms of their strength and stability.

Strands 241 and/or 242 can be comprised of any suitable material, including polymeric resins, metals, cellulose, natural fibers, and the like. Strands 241 and 242 can comprise the same material, or the material of strands 241 can be different from that of strands 242. In a particular embodiment, strands 241 and 242 can be comprised of thermoplastic materials. In a specific embodiment, strands 241 and 242 can comprise at least one component that comprises an enhanced ability to bond (e.g., by melt-bonding by lamination under heat and pressure) to such thermoplastic materials as are typically used to form porous layer 100 (e.g., polyolefins such as polypropylene, polyethylene, and blends and copolymers thereof). Such a material with an enhanced ability to bond to porous layer 100 may include for example, polypropylene, polyethylene, ethylene vinyl acetate, and the like.

In one embodiment, strands 240 are comprised of oriented thermoplastic materials. In a specific embodiment, strands 241 can be oriented to a different degree than strands 242. Strands 240 can comprise unpigmented thermoplastic resins, if it is desired that netting 200 blend into porous layer 100 in appearance. Or, strands 240 can be pigmented, for aesthetic effect or so that different colors of netting may be provided for different products, products with different performance ratings, and the like. Strands 240 may be generally circular in cross section; or they may have some other cross sectional shape (e.g., square, oval, irregular, etc.)

Strands 241 and 242 will comprise a strand diameter that can be measured at locations 244 (shown in FIG. 8) farthest from intersections 247. In this context, the term diameter denotes the equivalent diameter (e.g., the diameter of a circular strand with the same cross sectional area), if the strand has a non-circular cross sectional shape. In one embodiment, the thickness (measured along the thickness dimension, i.e. the shortest dimension, of netting 200) of the material at intersections 247 is substantially larger than the diameter of strands 241 and/or 242 (prior to any lamination process being performed, which in some instances may reduce the thickness of the material at intersections 247). In various embodiments, the thickness of the material at intersections 247 is at least about 150%, at least about 200%, or at least about 250%, of the diameter of strands 241 and/or 242, prior to any lamination process being performed. In this context, all such references herein to parameters such as strand diameter, intersection thickness, cover layer thickness, etc., should be understood to refer to average values obtained by multiple measurements, as is customary in the art.

Netting 200 is bonded to porous layer 100, i.e. by lamination. Such lamination may be most conveniently done by pressing netting 200 and porous layer 100 (e.g., in a nip between two rollers, or in between two platens) together, optionally with the application of heat, so as to bond the two layers together. In this context, lamination thus means that substantially all of the material of netting 200 is bonded to porous layer 100 (i.e., such that when a portion of porous layer 100 is pleated, the portion of netting 200 that is laminated to that portion of porous layer 100, is pleated as well, e.g., in exactly the same manner and pattern). This bonding may be augmented, in specific locations or over substantially all of the bonded area, by the use of ultrasonic bonding, adhesive bonding, and the like. As discussed later herein, in one embodiment netting 200 may be laminated to outside cover layer 150, which is then bonded to the remaining layers (e.g., filtration layer 140, inside cover layer 130, etc.) to form porous layer 100.

The inventor has discovered that it may be advantageous to bond netting 200 to porous layer 100 generally along the entirety of strands 241 and 242, as opposed to bonding netting 200 to porous layer 100 only at intersections 247. Thus, in an embodiment in which intersections 247 are appreciably thicker than the diameter of strands 241 and/or 242, care must be taken in the laminating of netting 200 to porous layer 100 to ensure that the bonding is sufficient to bond the entirety of strands 241 and/or 242 if this is desired. However, the bonding should not unacceptably increase the pressure drop of porous layer 100, as discussed below.

The inventor has also discovered that in the embodiment in which netting 200 is laminated to outside cover layer 150 to form laminate 350, after which laminate 350 is combined with other layers to form laminate 300, the relative values of the thickness of the individual strands 241/242, and the thickness of outside cover layer 150, can be usefully selected. Specifically, the inventor has discovered that if the ratio of the diameter of strands 241/242 to the thickness of outside cover layer 150 is at least about 2.0, netting 200 may be laminated to outside cover layer 150 (e.g., by via conventional heat and pressure methods) with surprisingly little effect on the pressure drop (that is, the pressure required to pass air through the laminate at a given rate) of resulting laminates 350 and 300. For example, the laminating of a netting with a strand diameter of approximately 10 mils, to an outside cover layer of thickness approximately 3 mils, may result in an appreciably lower increase in pressure drop than does the laminating of the same netting to an outside cover layer of thickness approximately 6 mils.

Thus, the inventor has discovered that not only may a relatively thin, low basis weight outside cover layer provide a pressure drop that is lower than the pressure drop provided by a thicker, higher basis weight outside cover layer, but also, that the increase in pressure drop that is incurred upon laminating a netting to the thin cover layer, may be appreciably less than that incurred upon laminating the netting to a thicker cover layer. Thus, the pressure drop exhibited by a mask comprising the combination of nettings and cover layers selected according to the disclosures herein may be markedly lower than that obtained otherwise. Thus, the use of such thin, low basis weight outside cover layers may be highly advantageous. And, as discussed in detail herein, the use of reinforcing netting in the manner described herein may allow such low basis weight, fragile outside cover layers to be successfully handled in assembly of mask 1, and may further allow mask 1 to exhibit acceptable, or even advantageously improved, durability.

In various embodiments, the diameter of the strands of netting 200 is from about 100 microns to about 400 microns, from about 120 microns to about 300 microns, or from about 150 microns to about 250 microns.

In various embodiments, the ratio of the diameter of the strands of netting 200, to the thickness of outside cover layer 150, is at least about 2.0, at least about 2.5, or at least about 3.0.

The inventor has further found that relatively low basis weight netting 200 can be laminated to relatively low basis weight outside cover layer 150 such that, in spite of the low basis weight of both materials, an advantageously strong and durable structure may be achieved, that can survive modern high-speed methods of face mask assembly and that can provide a mask that can be pleated and can undergo multiple unfolding/expansion and refolding cycles.

The inventor has further found that the presence of netting 200 can provide further improved properties to mask 1. Specifically, the presence of netting 200 on the surface of porous layer 100 (particularly if porous layer 100 comprises lightweight, low basis weight outside cover layer 150) can significantly improve the abrasion resistance of outside cover layer 150. While not being limited by theory or mechanism, the inventor believes that this may be due at least in part to the fact that, in embodiments disclosed herein, netting 200 may be laminated to porous layer 100 such that at least portions of netting 200 protrude above adjacent portions of second major (outer) surface 102 of porous layer 100. Thus in one embodiment, at least intersections 247 of netting 200 protrude above surface 102 of porous layer 100, e.g. about 4 mils above adjacent surface 102. In a further embodiment, substantially all portions of all strands 240 protrude above adjacent portions of surface 102 of porous layer 100.

The inventor has further found that the presence of (e.g., protruding) netting 200 upon porous layer 100 has been found by the inventor not to unacceptably preclude printing on porous layer 100. Such printing might be for aesthetic effect or might include product number, performance rating, and the like.

Nettings that may be used as described herein include for example the materials available from Conwed Corp. of Minneapolis, Minn., under the trade designation Thermanet 5103, the trade designation RO3470-007, and the trade designation RO1588.

Nonwoven webs that may be used as outside cover layers as described herein include for examples the materials available from Polymer Group, Inc., of Charlotte, N.C., under the trade designations B0189-5, B0137-5, 0009-009N, 0012-025N, 0016-007N, the material available from ATEX Corp. of Gainesville, Ga., under the trade designation AXAR, the material available from Leggett/Platt-Hanes Industries of Carthage, Mo., under the trade designation Elite 050 White, the material available from Fiberweb Company of Simpsonville, S.C., under the trade designation FPN 369D, and the materials available from Midwest Filtration, Cincinnati, Ohio, under the trade designations UNIPRO 150 and UNIPRO 200.

Although the discussions herein have primarily used the term "mask", it is understood that this term is used broadly to encompass devices that may be designated by terms such as respirator, personal respiratory protection device, surgical mask, operating room mask, clean room mask, dust mask, breath warming mask, face shield, and the like, in applications including e.g., industrial operations, consumer, home and outdoor use, health care operations, and the like. Such uses may include those in which the mask may be intended primarily for protection of a user's respiratory system, those in which the mask may be intended primarily to prevent material expelled from the user's respiratory system from reaching and/or contaminating the external environment, and uses that encompass both purposes. Masks as disclosed herein can comprise other features and functionalities as desired. These might include, for example, one or more exhalation valves, nose clips, nose foam, face seals, eye shields, neck coverings, and the like.

The present invention has now been described with reference to several embodiments thereof. It will be apparent to those skilled in the art that changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A flat-folded, pleated face mask that is expandable into a cup shape for fitting over the mouth and nose of a person, comprising:
   a porous layer comprising at least a first major surface that faces generally outward when the mask is expanded into a cup shape and that comprises reinforcing netting that is laminated to at least a portion of the first major surface of the porous layer so as to comprise the outermost, convex surface of the expanded mask,
   wherein the portion of the porous layer with reinforcing netting laminated to the first major surface thereof comprises a plurality of generally parallel pleats and is thereby expandable from a flat-folded configuration to an expanded, cup-shaped configuration by at least partially unfolding at least some of the pleats and is refoldable from the expanded, cup-shaped configuration to the flat-folded configuration by refolding the at least partially unfolded pleats,
   wherein the porous layer comprises a filtration layer and an outside cover layer with a first major surface that comprises the first major surface of the porous layer, and wherein the reinforcing netting is laminated to the first major surface of the outside cover layer,
   and further wherein the reinforcing netting comprises strands with a diameter, and wherein the outside cover layer comprises a thickness, and wherein the ratio of the diameter of the netting strands to the thickness of the outside cover layer is at least about 2.0.

2. The face mask of claim 1 wherein the outside cover layer comprises a nonwoven web of basis weight of less than about 35 grams per square meter.

3. The face mask of claim 1 wherein the diameter of the netting strands is from about 100 microns to about 400 microns.

4. The face mask of claim 3 wherein the diameter of the netting strands is from about 150 microns to about 250 microns.

5. The face mask of claim 1 wherein the outside cover layer comprises a nonwoven web of basis weight of less than about 25 grams per square meter.

6. The face mask of claim 1 wherein the ratio of the diameter of the netting strands to the thickness of the outside cover layer is at least about 3.0.

7. The face mask of claim 1 wherein the reinforcing netting comprises a first set of generally parallel strands and a second set of generally parallel strands that are generally perpendicular to the first set of generally parallel strands, and wherein the pleats in the pleated porous layer are generally aligned with one of the sets of strands.

8. The face mask of claim 7 wherein the porous layer comprises a long axis and a short axis and wherein the pleats of the porous layer, and one of the sets of strands of the reinforcing netting, are generally aligned with the long axis of the porous layer.

9. The face mask of claim 1 wherein the reinforcing netting is bonded to the porous layer by melt bonding of at least one component of the netting, to at least one component of the porous layer.

10. The face mask of claim 1 wherein at least a portion of the netting protrudes above an adjacent surface of the porous layer by at least about 4 mils.

11. The face mask of claim 1 wherein the netting comprises a basis weight of less than about 35 grams per square meter.

12. The face mask of claim 1 wherein the porous layer and the reinforcing netting laminated to the first major surface thereof are expandable and refoldable for multiple cycles.

13. The face mask of claim 1 wherein the porous layer comprises seamed edges and wherein the reinforcing netting is bonded into the seamed edges of the porous layer.

14. A method of making a flat-folded, pleated face mask that is expandable into a cup shape for fitting over the mouth and nose of a person, comprising:
   providing a laminate comprising a nonwoven web that comprises first and second oppositely facing major surfaces with reinforcing netting laminated to the first major surface;
   providing at least one porous layer with first and second oppositely-facing major surfaces;

attaching the laminate to the at least one porous layer, with the second major surface of the nonwoven web facing a major surface of the at least one porous layer, to form a multilayer structure;
and,
forming a plurality of generally parallel pleats in the multilayer structure so that the multilayer structure is expandable into a cup shape,
   wherein when the multilayer structure is expanded into a cup shape the reinforcing netting comprises the outermost, convex surface of the expanded multilayer structure,
   and further wherein the reinforcing netting comprises strands with a diameter, and wherein the nonwoven web comprises a thickness, and wherein the ratio of the diameter of the netting strands to the thickness of the nonwoven web is at least about 2.0.

15. The method of claim 14 wherein the nonwoven web comprises a lightweight, highly porous spunbonded nonwoven of basis weight of about 34 grams per square meter or less.

16. The method of claim 15 wherein the nonwoven web has a basis weight of about 17 grams per square meter or less.

17. The method of claim 14 wherein the netting comprises a basis weight of less than about 35 grams per square meter.

18. The method of claim 14 wherein the porous layer comprises at least one edge, and wherein the attaching of the laminate to the at least one porous layer comprises bonding the laminate to the porous layer at least at one edge of the porous layer.

* * * * *

UNITED STATES PATENT AND TRADEMARK OFFICE
CERTIFICATE OF CORRECTION

| | |
|---|---|
| PATENT NO. | : 9,012,013 B2 |
| APPLICATION NO. | : 12/338091 |
| DATED | : April 21, 2015 |
| INVENTOR(S) | : Dean Duffy |

Page 1 of 1

It is certified that error appears in the above-identified patent and that said Letters Patent is hereby corrected as shown below:

In the Specification:

<u>Column 4</u>
Line 18, Delete "through" and insert -- though --, therefor.

Signed and Sealed this
Ninth Day of August, 2016

Michelle K. Lee
*Director of the United States Patent and Trademark Office*